(12) United States Patent
Jacquemetton et al.

(10) Patent No.: US 12,409,512 B2
(45) Date of Patent: Sep. 9, 2025

(54) DETERMINATION AND CONTROL OF COOLING RATE IN AN ADDITIVE MANUFACTURING SYSTEM

(71) Applicant: DIVERGENT TECHNOLOGIES, INC., Los Angeles, CA (US)

(72) Inventors: Lars Jacquemetton, Santa Fe, NM (US); Martin S. Piltch, Los Alamos, NM (US); Darren Beckett, Corrales, NM (US)

(73) Assignee: Divergent Technologies, Inc., Los Angeles, CA (US)

( * ) Notice: Subject to any disclaimer, the term of this patent is extended or adjusted under 35 U.S.C. 154(b) by 0 days.

(21) Appl. No.: 17/349,747

(22) Filed: Jun. 16, 2021

(65) Prior Publication Data
US 2021/0394302 A1  Dec. 23, 2021

Related U.S. Application Data

(60) Provisional application No. 63/041,026, filed on Jun. 18, 2020.

(51) Int. Cl.
*B23K 26/03* (2006.01)
*B22F 10/368* (2021.01)
(Continued)

(52) U.S. Cl.
CPC .......... *B23K 26/034* (2013.01); *B22F 10/368* (2021.01); *B22F 10/85* (2021.01);
(Continued)

(58) Field of Classification Search
CPC ...... B33Y 30/00; B33Y 50/02; B23K 26/034; B23K 26/342; B23K 26/0626;
(Continued)

(56) References Cited

U.S. PATENT DOCUMENTS

| 9,977,425 | B1 | 5/2018 | Mccann et al. |
| 10,254,754 | B2 | 4/2019 | Mccann et al. |

(Continued)

FOREIGN PATENT DOCUMENTS

| CN | 105829075 A | 8/2016 |
| EP | 3070554 B1 | 2/2018 |
| WO | 2019165111 A1 | 8/2019 |

OTHER PUBLICATIONS

PCT/US2021/037782, "International Search Report and Written Opinion", Oct. 5, 2021, 11 pages.
(Continued)

*Primary Examiner* — Elizabeth M Kerr
*Assistant Examiner* — Simpson A Chen
(74) *Attorney, Agent, or Firm* — FisherBroyles, LLP

(57) ABSTRACT

An additive manufacturing system includes a work region having a layer of metallic powder distributed across at least a portion of the work region. The system further includes a power source, a scanning and focusing system and a processor. The processor is configured to control the power source to emit a beam of energy at a power level and to manipulate the beam of energy across the work region in a plurality of build tracks to form a part from the fused metallic powder. The processor further determines a cooling rate at a termination of each of the plurality of build tracks and controls the power level of the power source in response to the determined cooling rate.

10 Claims, 6 Drawing Sheets

(51) Int. Cl.
- *B22F 10/85* (2021.01)
- *B22F 12/41* (2021.01)
- *B22F 12/49* (2021.01)
- *B22F 12/90* (2021.01)
- *B23K 26/06* (2014.01)
- *B23K 26/082* (2014.01)
- *B23K 26/342* (2014.01)
- *B33Y 30/00* (2015.01)
- *B33Y 50/02* (2015.01)
- *G01J 5/10* (2006.01)

(52) U.S. Cl.
CPC .............. *B22F 12/41* (2021.01); *B22F 12/49* (2021.01); *B22F 12/90* (2021.01); *B23K 26/0626* (2013.01); *B23K 26/342* (2015.10); *B33Y 30/00* (2014.12); *B33Y 50/02* (2014.12); *B23K 26/082* (2015.10); *G01J 5/10* (2013.01)

(58) Field of Classification Search
CPC ........ B23K 26/082; B22F 10/85; B22F 12/49; B22F 12/41; B22F 12/90; B22F 10/368; G01J 5/10
USPC ....................................................... 219/76.11
See application file for complete search history.

(56) References Cited

U.S. PATENT DOCUMENTS

| | | | |
|---|---|---|---|
| 10,705,509 | B2 | 7/2020 | Snyder et al. |
| 10,725,459 | B2 | 7/2020 | Good et al. |
| 2011/0001812 | A1 | 1/2011 | Kang et al. |
| 2013/0305357 | A1 | 11/2013 | Ayyagari et al. |
| 2014/0265046 | A1 | 9/2014 | Burris et al. |
| 2015/0170501 | A1 | 6/2015 | Mukherji et al. |
| 2016/0236279 | A1* | 8/2016 | Ashton ................. B29C 64/153 |
| 2016/0302148 | A1 | 10/2016 | Buck et al. |
| 2017/0090462 | A1 | 3/2017 | Dave et al. |
| 2018/0311769 | A1 | 11/2018 | Tenhouten et al. |
| 2019/0039318 | A1* | 2/2019 | Madigan ................. B33Y 50/02 |
| 2019/0047226 | A1* | 2/2019 | Ishikawa ............... B29C 64/209 |
| 2019/0217416 | A1* | 7/2019 | Brochu ................... G06F 30/23 |
| 2019/0255654 | A1* | 8/2019 | Beckett ................. B29C 64/153 |

OTHER PUBLICATIONS

PCT/US2021/037782, "International Preliminary Report on Patentability", Dec. 29, 2022, 7 pages.

* cited by examiner

DETERMINATION AND CONTROL OF COOLING RATE IN AN ADDITIVE MANUFACTURING SYSTEM

CROSS-REFERENCES TO OTHER APPLICATIONS

This application claims priority to U.S. provisional patent application Ser. No. 63/041,026, for "METHOD AND APPARATUS FOR DETERMINATION AND CONTROL OF COOLING RATE" filed on Jun. 18, 2020 which is hereby incorporated by reference in entirety for all purposes.

BACKGROUND OF THE INVENTION

Additive manufacturing, or the sequential assembly or construction of a part through the combination of material addition and applied energy, takes on many forms and currently exists in numerous implementations and embodiments. Additive manufacturing can be carried out by using any of a number of various processes that involve the formation of a three dimensional part of virtually any shape. The various processes that are used for making metallic parts have in common the sintering and/or melting of powdered or granular raw material, layer by layer using one or more high powered energy sources such as a laser or electron beam. As the pattern, speed and power of the energy source is varied the rate at which the sintered and/or melted material cools can change, which can impact the material properties of the part. To improve reliability and consistency of additive manufactured parts it is desirable to determine and to control the cooling rate of the material as the part is constructed.

SUMMARY

In some embodiments an additive manufacturing system comprises a power source configured to emit a beam of energy that impinges a work region of a build plane and a sensor configured to sense a temperature of the work region. A processor is coupled to the sensor and is configured to determine a cooling rate of the work region after the power source has been terminated. In various embodiments the sensor comprises a first emissivity sensor configured to detect a first range of wavelengths and a second emissivity detector configured to detect a second range of wavelengths, wherein the first and the second range are different ranges. In some embodiments the first range of wavelengths and the second range of wavelengths are selected to be offset from one or more characteristic spectral peaks related to material properties of a metallic powder distributed across at least a portion of the work region.

In some embodiments the beam of energy creates a transient melt pool of the metallic powder. In various embodiments the processor is configured to generate a notification if the determined cooling rate of the melt pool is outside of an allowable range of cooling rates. In some embodiments the power source is configured to fuse metallic powder distributed across at least a portion of the build plane along a plurality of sequential build tracks. In various embodiments the power source is turned on at a beginning of each build track of the plurality of sequential build tracks and turned off at an end of each build track of the plurality of sequential build tracks.

In some embodiments the cooling rate is determined at the end of each build track of the plurality of sequential build tracks. In various embodiments a power of the power source is determined from a thermal energy density (TED) of a portion of the work region. In some embodiments the processor is configured to change the power of the power source in a portion of the work region.

In some embodiments an additive manufacturing system comprises a work region including a layer of metallic powder, a power source, a scanning and focusing system and a processor configured. In some embodiments the processor is configured to control the power source to emit a beam of energy at a power level and to manipulate the beam of energy across the work region in a plurality of build tracks to form a part. The processor can also determine a cooling rate at a termination of each of the plurality of build tracks and control the power level of the power source in response to the determined cooling rate.

In some embodiments the power source is turned on at a beginning of each build track of the plurality of the plurality of build tracks and turned off at a termination of each build track of the plurality of build tracks. In various embodiments the additive manufacturing system further comprises a temperature sensor arranged to detect a temperature of the work region at the termination of each of the plurality of build tracks after the power source is turned off. In some embodiments the temperature sensor comprises a first emissivity sensor configured to detect a first range of wavelengths and a second emissivity detector configured to detect a second range of wavelengths, wherein the first and the second range are different ranges.

In some embodiments the first range of wavelengths and the second range of wavelengths are selected to be offset from one or more characteristic spectral peaks related to material properties of the metallic powder. In various embodiments the beam of energy creates a transient melt pool of the metallic powder. In some embodiments the processor is configured to generate a notification if the determined cooling rate is outside of an allowable range of values. In various embodiments the power level of the power source is determined from a thermal energy density (TED) of a portion of the work region. In some embodiments the TED is determined from the power input into a defined portion of the work region divided by an area traversed by the plurality of build tracks in the defined portion. In various embodiments the power input into the defined portion of the work region is determined by integrating a voltage of a photodiode arranged to receive sensory input from the work region.

Numerous benefits are achieved by way of the present invention over conventional techniques. For example, embodiments of the present invention provide the ability to control a microstructure of the finished part thereby controlling the material properties of the finished part. The microstructure can be controlled for quality control purposes (e.g., to detect quality issues and/or fix quality issues) and/or to produce parts having known material properties. Further, the present invention enables material properties to be varied with a monolithic part such that certain areas can have material properties different than other regions.

DETAILED DESCRIPTION

Some embodiments of the present disclosure relate to methods of determining and/or controlling the cooling rate of a work region in additive material manufacturing systems. While the present disclosure can be useful for a wide variety of configurations, some embodiments of the disclosure are particularly useful for detecting defects within and controlling the material properties of parts made with additive manufacturing systems, as described in more detail below.

Figure 1:
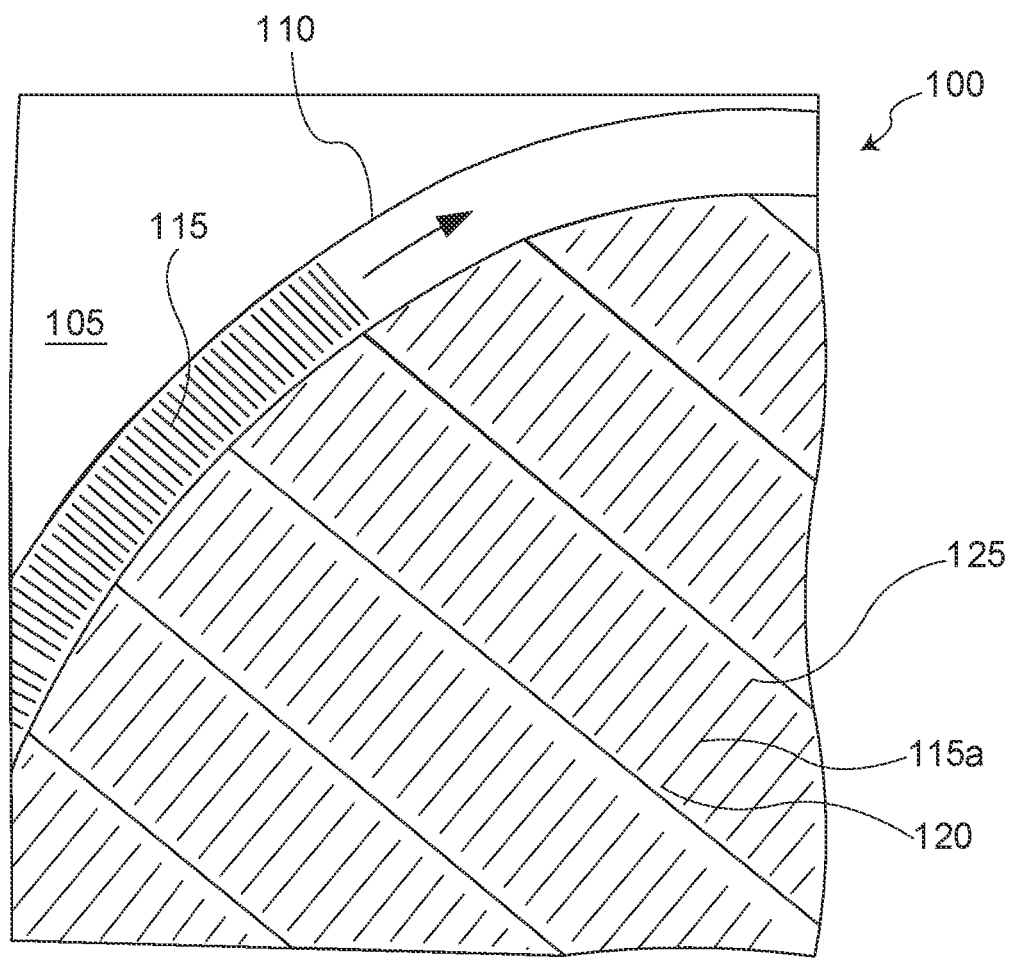
FIG. 1 illustrates a partial plan view of a work plane of a part during fabrication by an additive manufacturing machine, according to embodiments of the disclosure.

FIG. 1 illustrates a partial plan view of a work plane 105 of a part 100 during fabrication by an additive manufacturing machine. As shown in FIG. 1, an energy source fuses metallic powder across work plane 110 of part 100 using a series of build tracks 115. Each build track 115, such as track 115a, includes a beginning 120 where the energy source is turned on and an end 125 where the energy source is turned off. Each build track 115 fuses a portion of the metallic powder to the workpiece. This process is repeated layer by layer until part 100 is completed.

Along each build track 115 the fused material has a cooling rate that is determined by the amount of energy delivered by the energy source and the traversing speed of the energy source. At end 125 of build track 115a, a maximum cooling rate is experienced because the energy source is turned off so there is no energy being supplied to an adjacent area. With many metallic materials, the cooling rate of the fused material determines the crystal structure which affects the mechanical properties of part 100. Embodiments herein describe methods and an apparatus for monitoring and/or controlling the cooling rate, as described in more detail herein.

Figure 2:
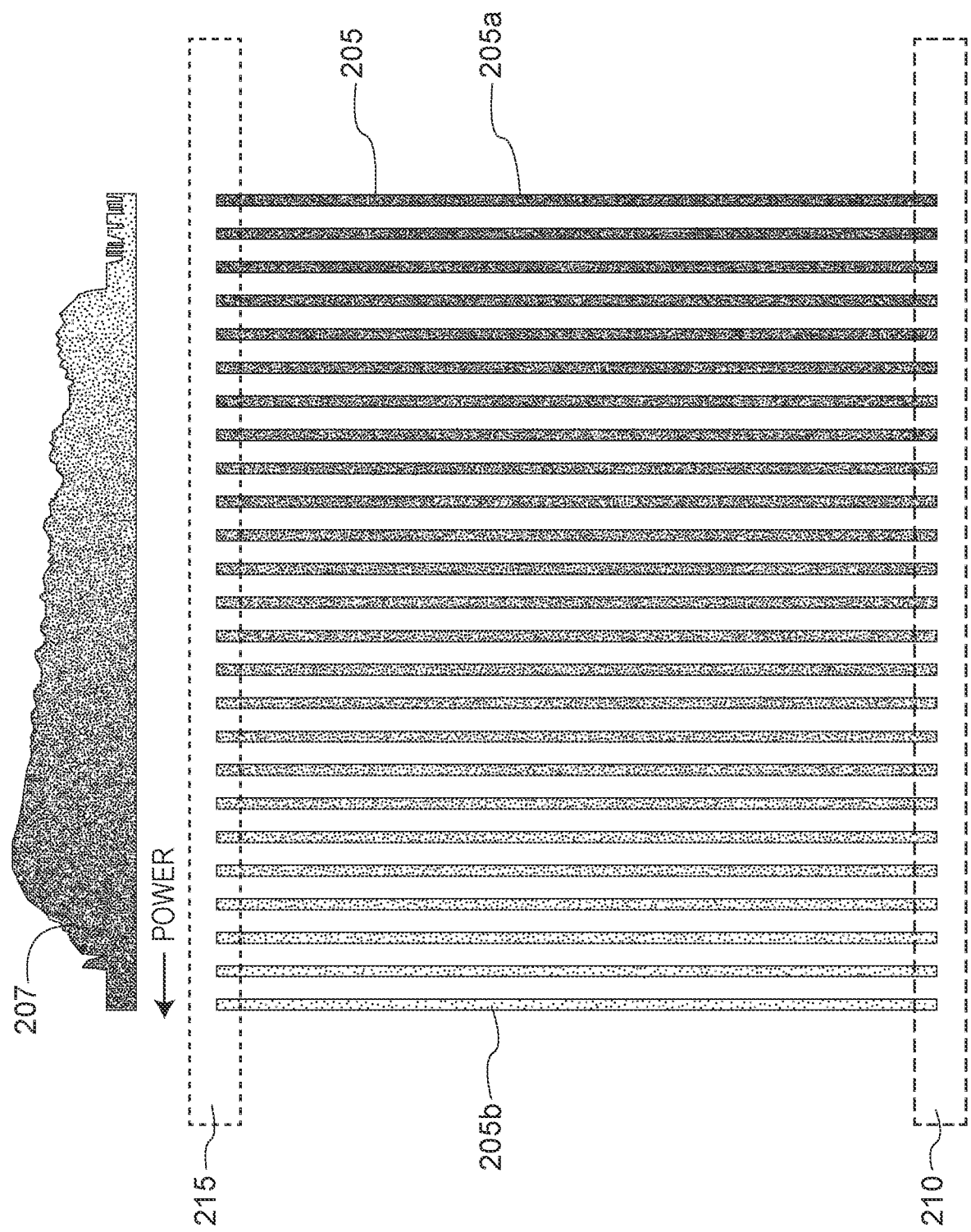
FIG. 2 is illustrates a series of build tracks that each have a power source turn on region and a turn off region, according to embodiments of the disclosure.

FIG. 2 illustrates a series of build tracks 205 that each have a power source turn-on region 210 and a turn-off region 215. As shown in the histogram 207 of FIG. 2, progressing from right to left the power of the energy source is increased.

Figure 3:
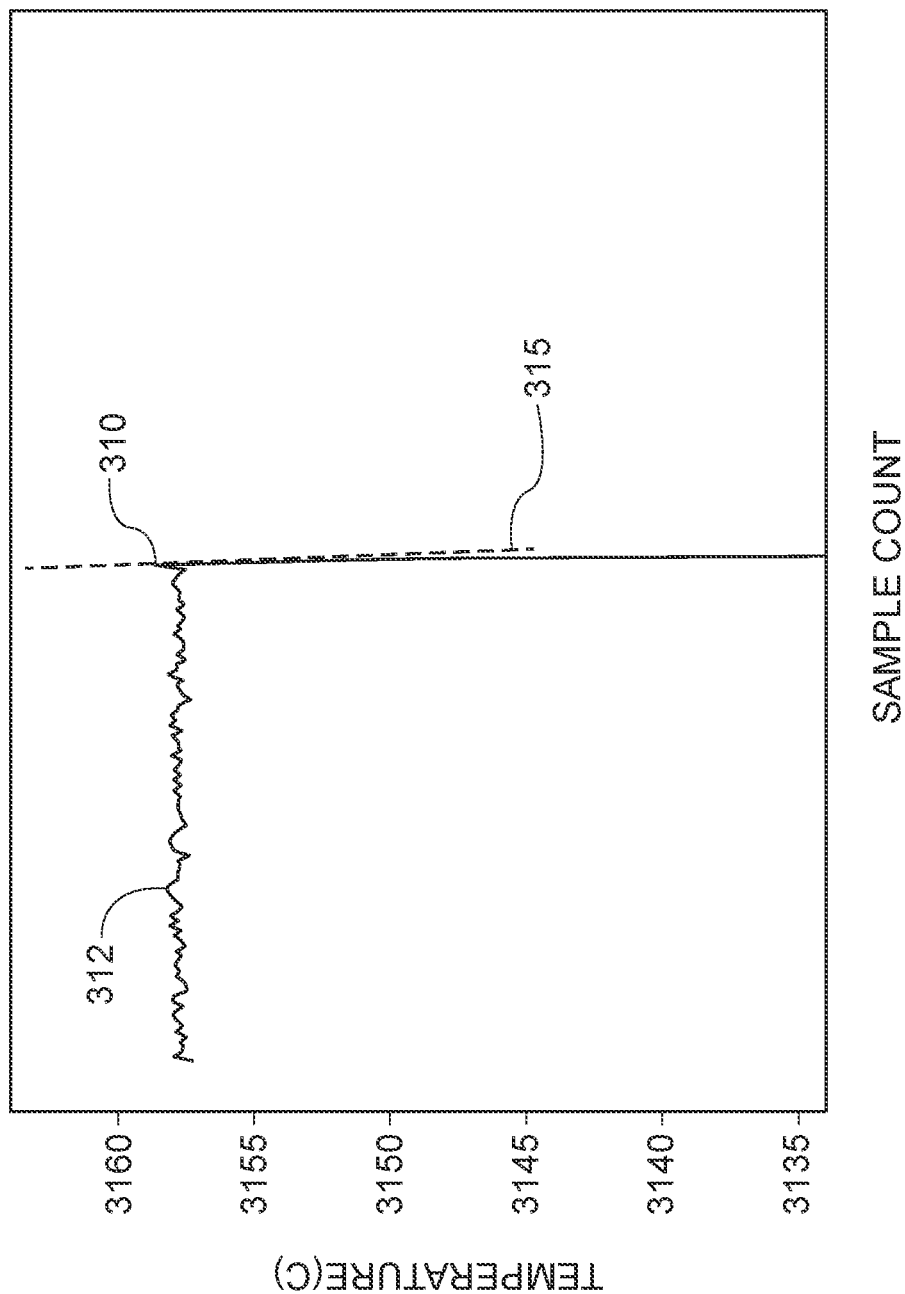
FIG. 3 illustrates a plot of a temperature of a work region along an example build track of FIG. 2 in the turn off region.

FIG. 3 illustrates a plot of a temperature 312 of a work region along an example build track (e.g., build track 205b of FIG. 2) in the turn-off region 215 (see FIG. 2). As shown in FIG. 3 the temperature 312 of the build track in the work region at which the energy source impinges is at approximately 3157° C. until the energy source is turned off at point 310. Line 315 approximates the cooling rate of the work region immediately after the energy source is turned off In this particular example the cooling rate is 461,365° C./second. A similar methodology can be used for each build track 205 (see FIG. 2) that is performed at different powers to characterize the dependence of the cooling rate on the power of the energy source.

Figure 4:
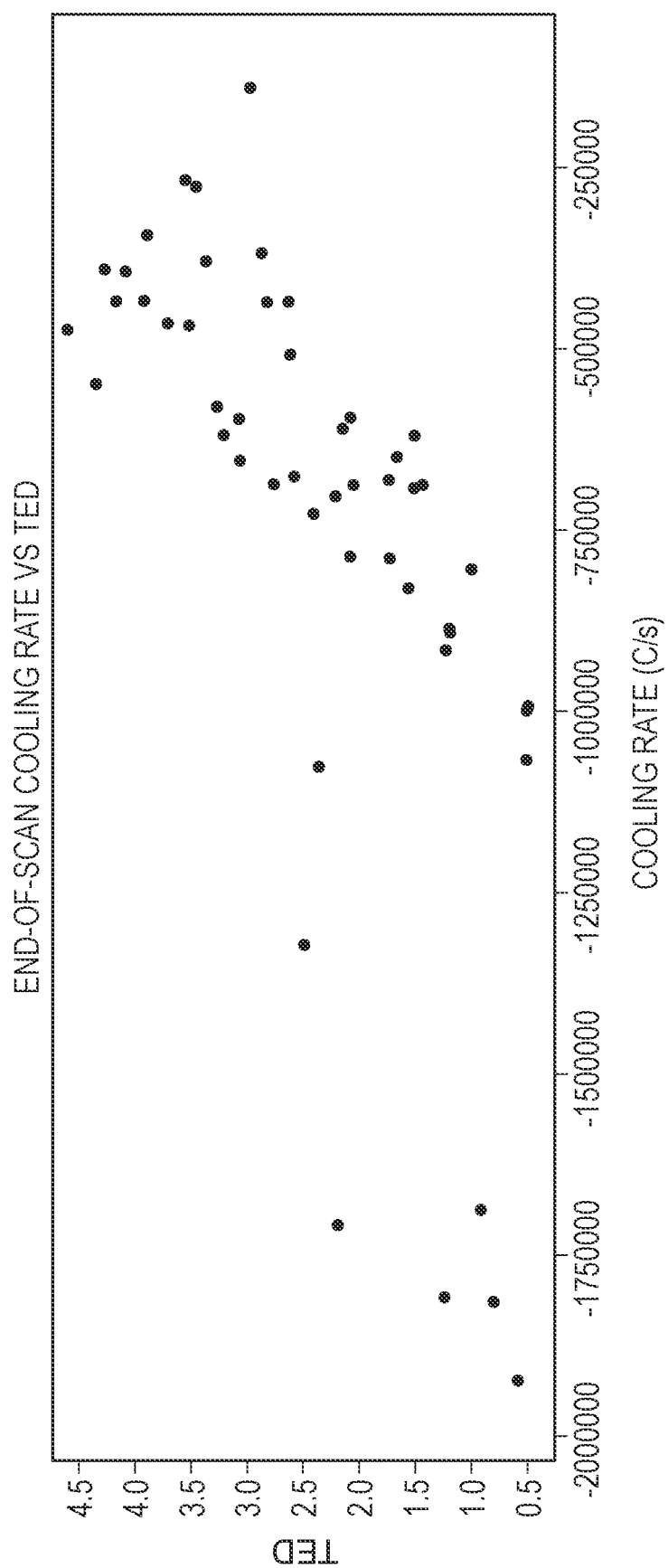
FIG. 4 illustrates a chart showing the dependence of the end of scan cooling rate on the power of the energy source, according to embodiments of the disclosure.

FIG. 4 illustrates a chart showing the dependence of the end of scan cooling rate on the power of the energy source. In some embodiments the power of the energy source is determined by using a thermal energy density (TED) as described in more detail below, while in other embodiments the power input into the laser can be used. As shown in FIG. 4, generally, for this particular example material the cooling rate increases with decreasing energy input from the energy source. As defined herein, a high cooling rate is one that proceeds rapidly, that is, experiences a rapid reduction in temperature as a function of time. Conversely, a low cooling rate is experiences a slower reduction in temperature as a function of time. As further shown in FIG. 4, the cooling rate can be varied from a little under 2,000,000° C./second down to less than 250,000° C./second by increasing the TED from 0.5 to 4.5, respectively.

In some embodiments the TED is determined by the following process. A length associated with $scan_i$, $L_i$, can be determined. $L_i$ can be calculated using equation (1), where $x1_i$, $y1_i$ and $x2_i$, $y2_i$ represent respective beginning and end locations for $scan_i$:

$$L_i = \sqrt{(x1_i - x2_i)^2 + (y1_i - y2_i)^2} \quad \text{Eq(1)}$$

Next, the total length of all scans used to produce the part, $Lsum_p$, can be determined. The $Lsum_p$ over the part can be determined by summing the length of each scan, $L_i$, associated with the part. The prorated area of the scan, $A_i$, can be calculated using equation (2):

$$A_p = \frac{(A_i * L_i)}{Lsum_i} \quad \text{Eq(2)}$$

Finally, the prorated thermal energy density (TED) for the $i^{th}$ scan, $TED_i$, can be determined. $TED_i$ is an example of a set of reduced order process features. In some embodiments the TED can be calculated using raw photodiode data. From this raw sensor data, the TED calculation extracts reduced order process features from the raw sensor data. In various embodiments, $TED_i$ can be sensitive to user defined laser powder bed fusion process parameters, for example laser power, laser speed, hatch spacing, among others. The power input can be determined from the area under the raw photodiode data trace for $scan_i$, hereinafter, $pdon_i$. In some embodiments, $pdon_i$ can represent the integrated photodiode voltage. In some embodiments, $pdon_i$ represents the average reading of the photodiode during $scan_i$. $TED_i$ can be calculated using equation (3):

$$TED_i = \frac{pdon_i}{A_i} \quad \text{Eq(3)}$$

Additional details regarding the determination of TED can be found in U.S. Pat. Nos. 10,479,020 and 10,639,745 which are incorporated herein in their entirety for all purposes.

In some embodiments a particular build material may be characterized to determine the effects of the laser power on the cooling rate, then upper and/or lower cooling rate thresholds can be set accordingly to control the cooling rate within the part during the build cycle. In further embodiments, because the laser off cooling rate is likely the maximum cooling rate experienced within the part, the laser off cooling rate can be used as an indicator (i.e., a metric) of the properties of the part. In some embodiments, tensile and compressive strengths can be inversely related to grain size in the finished part. In further embodiments, particular part geometries may affect the cooling rate and thus scan lines that are on an edge or other feature of the part can be individually characterized and controlled accordingly. In further embodiments the cooling rate can be intentionally adjusted and controlled to achieve desired mechanical properties of the final part. For example, one component may need a higher tensile strength and higher hardness so the cooling rate may be increased for that particular part. One of skill in the art having the benefit of this disclosure will appreciate the various ways in which monitoring and/or adjusting the cooling rate can be used to control part quality and/or material properties.

Figure 5:
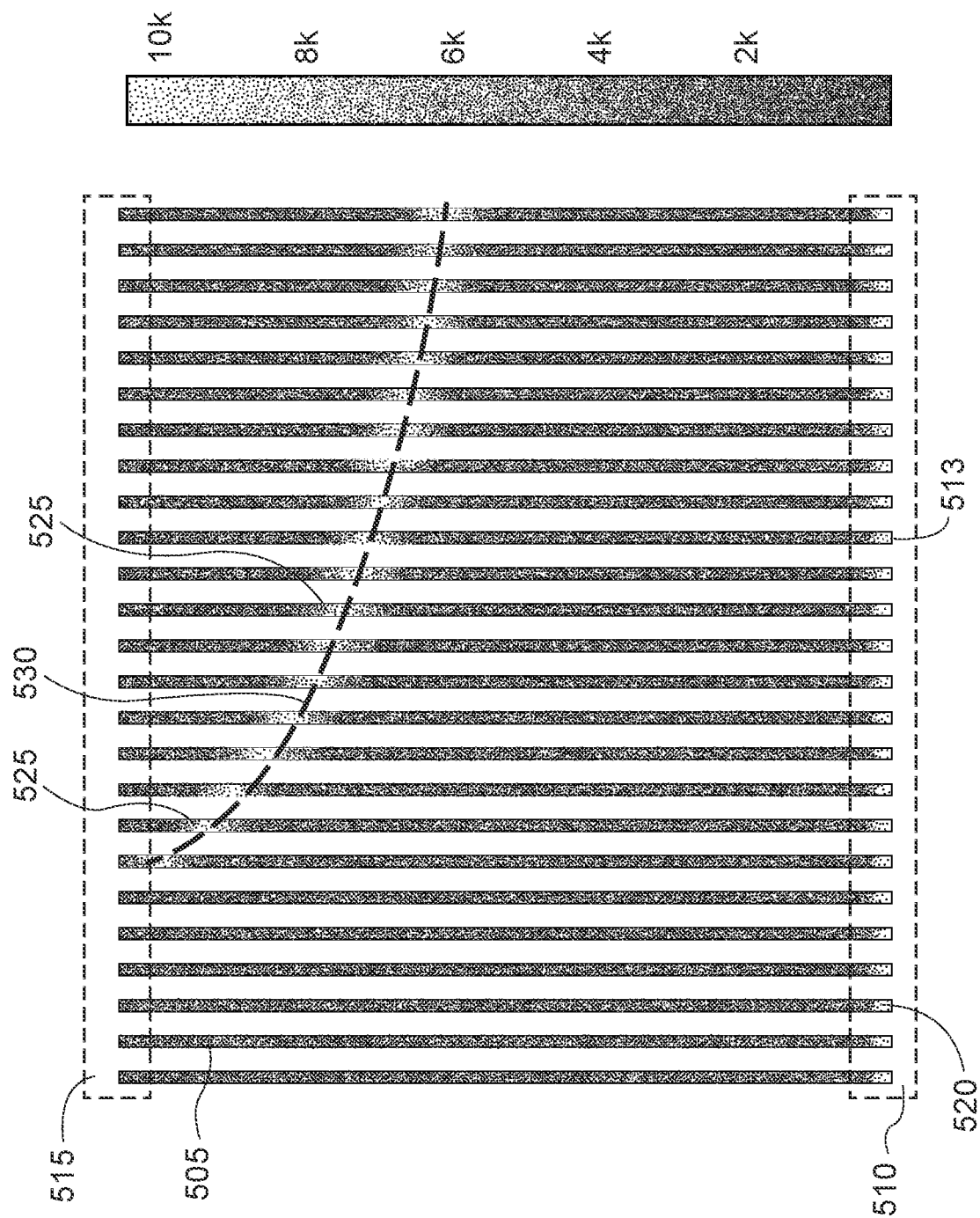
FIG. 5 illustrates an image showing the instantaneous cooling rate along each of a series of build tracks, according to embodiments of the disclosure.

FIG. 5 illustrates an image showing the instantaneous cooling rate along each of a series of build tracks 505. As shown in FIG. 5, progressing from right to left the power of the energy source is sequentially increased. In this chart the end of scan region 510 is the bottom and the beginning of the scan region 515 is the top. Generally, the instantaneous cooling rate along the build track is between 1000° C./second to 2500° C./second, however at the end of scan point 520 of each build track 505, the cooling rate is much higher, in the range of at least 8,000 to 10,000° C./second (as evidenced by the lighter colored regions 513).

Also shown in FIG. 5 are aberrations 525 (light colored regions) that are distributed along a curve 530. Aberrations 525 are optical aberrations from the optical system and in some embodiments are optical interference regions from interference of the optics within the system. The apparent movement of aberration 525 from one build track 505 to another can be an artifact of an optical "ring" caused by an optical defect on the receiving side of the beam splitter employed in a laser-based energy source. The aberration shows up in the instantaneous cooling rate calculation because the optical defect causes light to fluctuate at that location. In some embodiments this process and methodology can be used to detect and/or characterize optical aberrations within the system.

In some embodiments the instantaneous cooling rate along each build track can be used as a metric to either alert an operator that a defect may have occurred, or to adjust the mechanical properties of the part, as described above. One of skill in the art having the benefit of this disclosure will appreciate the various different ways in which monitoring and/or adjusting the instantaneous cooling rate can be used.

Figure 6:
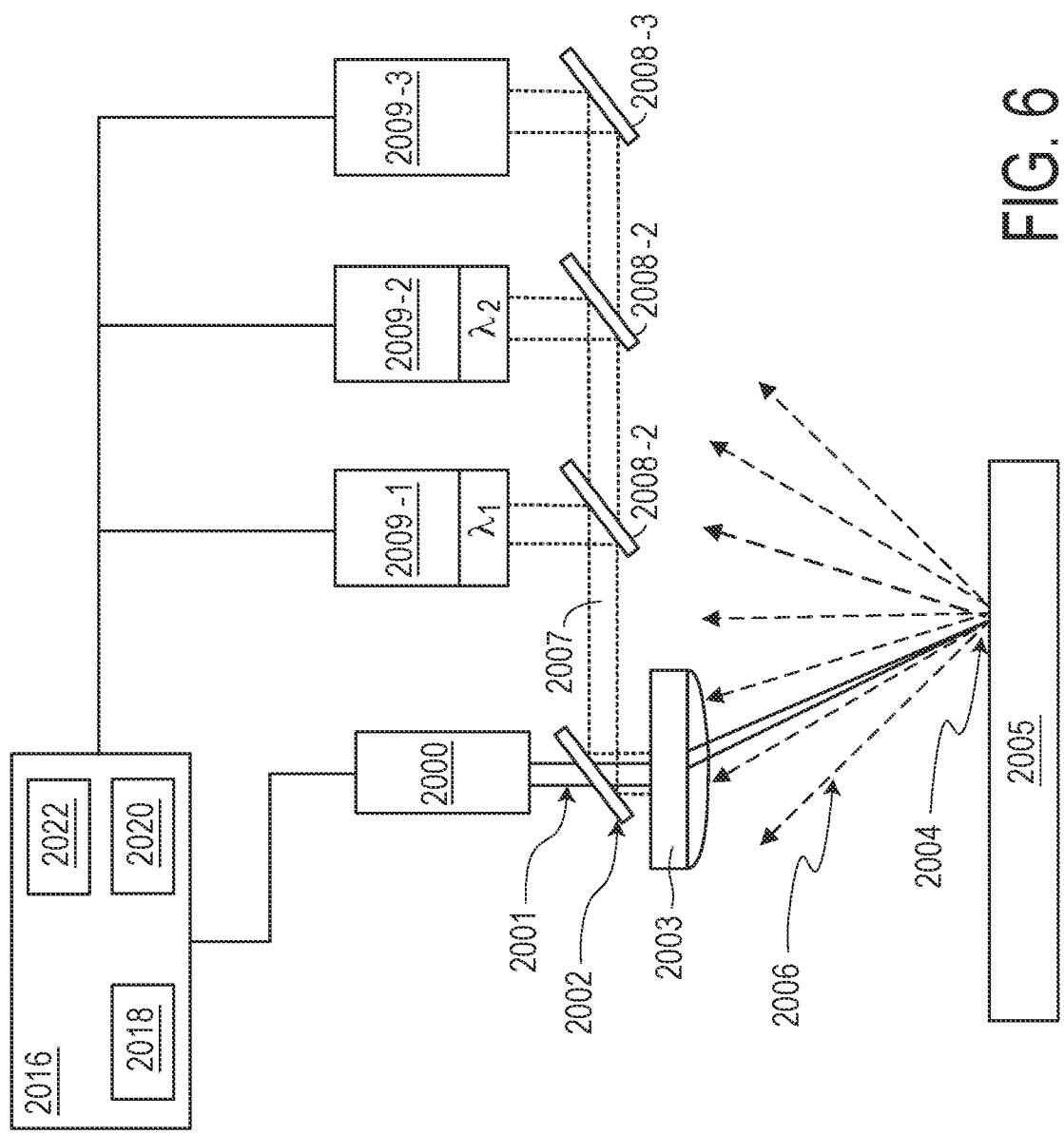
FIG. 6 illustrates an example additive manufacturing system, according to embodiments of the disclosure.

FIG. 6 shows an example additive manufacturing system that is equipped with three optical sensors in which two of the optical sensors monitor discrete wavelengths of light to characterize temperature variations in real-time occurring on a build plane and the third optical sensor is configured to measure thermal energy density. The thermal energy density is sensitive to changes in process parameters such as, for example, energy source power, energy source speed, and hatch spacing. The additive manufacturing system of FIG. 6 uses a laser 2000 as the energy source. The laser 2000 emits a laser beam 2001 which passes through a partially reflective mirror 2002 and enters a scanning and focusing system 2003 which then projects the beam to a region 2004 on build plane 2005. In some embodiments, build plane 2005 is a powder bed. Optical energy 2006 is emitted from region 2004 due to the high material and plume temperatures based on emissivity properties of the materials being irradiated by laser beam 2001.

In some embodiments, the scanning and focusing system 2003 can be configured to collect some of the optical energy 2006 emitted from region 2004. In some embodiments, a melt pool and luminous plume can cooperatively emit blackbody radiation from within region 2004. The melt pool is the result of powdered metal liquefying due to the energy imparted by laser beam 2001 and is responsible for the emission of a majority of the optical energy 2006 being reflected back toward focusing system 2003. The luminous plume results from vaporization of portions of the powdered metal. In some embodiments the luminous plume can emit a majority or substantially all of optical energy 2006. The partially reflective mirror 2002 can reflect a majority of optical energy 2006 received by focusing system 2003. This reflected energy is indicated on FIG. 6 as optical energy 2007. The optical energy 2007 may be interrogated by on-axis optical sensors 2009-1 and 2009-2 and/or off-axis sensors (not shown in FIG. 6). Each of the on-axis optical sensors 2009 receive a portion of optical energy 2007 through mirrors 2008-1 and 2008-2. In some embodiments, mirrors 2008 can be configured to reflect only wavelengths $\lambda_1$ and $\lambda_2$, respectively.

In some embodiments, optical sensors 2009-1 and 2009-2 receive a total of 80-90% of the light reflected through the optics train. Optical sensors 2009-1 and 2009-2 can also include notch filters that are configured to block any light outside of respective wavelengths $\lambda_1$ and $\lambda_2$. Third optical sensor 2009-3 can be configured to receive light from partially reflective mirror 2002. As depicted in FIG. 6, a third optical sensor 2009-3 can be used. In some embodiments, optical sensors 2009-1 and 2009-2 can be covered by notch filters while third optical sensor 2009-3 can be configured to measure a relatively larger range of wavelengths. In some embodiments, optical sensor 2009-1 or 2009-2 can be replaced with a spectrometer configured to perform an initial characterization of a blackbody radiation curve associated with a batch of powder being used to perform an additive manufacturing process. This characterization can then be used to determine how the wavelength filters of optical sensors 2009-1 and 2009-2 are configured to be offset and avoid any spectral peaks associated with the black body curve characterized by the spectrometer. More specifically, in some embodiments the metal powder may have characteristic spectral peaks that should be avoided when selecting frequencies to monitor to determine temperatures. This characterization can be performed prior to a full additive manufacturing operation being carried out.

It should be noted that the collected optical energy 2007 may not have the same spectral content as the optical energy 2006 emitted from the beam interaction region 2004 because the optical energy 2007 has suffered some attenuation after going through multiple optical elements such as partially reflective mirror 2002, scanning and focusing system 2003, and one or more of partially reflective mirrors 2008. These optical elements may each have their own transmission and absorption characteristics resulting in varying amounts of attenuation that thus limit certain portions of the spectrum of energy radiated from the beam interaction region 2004. The data generated by on-axis optical sensors 2009 may correspond to an amount of energy imparted on the work platform. This allows the notch feature wavelengths to be selected to avoid frequencies that are overly attenuated by absorption characteristics of the optical elements.

Examples of on-axis optical sensors 2009 include but are not limited to photo to electrical signal transducers (i.e. photodetectors) such as pyrometers and photodiodes. The optical sensors can also include spectrometers, and low or high speed cameras that operate in the visible, ultraviolet, or the infrared frequency spectrum. The on-axis optical sensors 2009 are in a frame of reference which moves with the beam, i.e., they see all regions that are touched by the laser beam and are able to collect optical energy 2007 from all regions of the build plane 2005 touched as the laser beam 2001 scans across build plane 2005. Because the optical energy 2006 collected by the scanning and focusing system 2003 travels a path that is near parallel to the laser beam, sensors 2009 can be considered on-axis sensors.

In some embodiments, the additive manufacturing system can include off-axis sensors that are in a stationary frame of reference with respect to the laser beam 2001. Additionally, there could be contact sensors on a recoater arm configured to spread metallic powders across build plane 2005. These sensors could be accelerometers, vibration sensors, etc. Lastly, there could be other types of sensors such as thermocouples to measure macro thermal fields or could include acoustic emission sensors which could detect cracking and other metallurgical phenomena occurring in the deposit as it is being built.

In some embodiments, a computer 2016, including a processor 2018, computer readable medium 2020, and an I/O interface 2022, is provided and coupled to suitable system components of the additive manufacturing system in order to collect data from the various sensors. Data received by the computer 2016 can include in-process raw sensor data and/or reduced order sensor data. The processor 2018 can use in-process raw sensor data and/or reduced order sensor data to determine laser 2000 power and control information, including coordinates in relation to the build plane 2005. In other embodiments, the computer 2016, including the processor 2018, computer readable medium 2020, and an I/O interface 2022, can provide for control of the various system components. The computer 2016 can send, receive, and monitor control information associated with the laser 2000, the build plane 2005, and other associated components and sensors.

The processor 2018 can be used to perform calculations using the data collected by the various sensors to generate in-process quality metrics. In some embodiments, data generated by on-axis optical sensors 2009 can be used to determine thermal energy density (TED) during the build process. Control information associated with movement of the energy source across the build plane can be received by the processor. The processor can then use the control information to correlate data from on-axis optical sensor(s) 109 and/or off-axis optical sensor(s) 110 with a corresponding location. This correlated data can then be combined to calculate thermal energy density. In some embodiments, the thermal energy density and/or other metrics can be used by processor 2018 to generate control signals for process parameters, for example, laser power, laser speed, hatch spacing, and other process parameters in response to the thermal energy density or other metrics falling outside of desired ranges. In this way, a problem that might otherwise ruin a production part can be ameliorated. In embodiments where multiple parts are being generated at once, prompt corrections to the process parameters in response to metrics falling outside desired ranges can prevent adjacent parts from receiving too much or too little energy from the energy source.

In some embodiments, the I/O interface 2022 can be configured to transmit data collected to a remote location. The I/O interface 2022 can be configured to receive data from a remote location. The data received can include baseline datasets, historical data, post-process inspection data, and classifier data. The remote computing system can calculate in-process quality metrics using the data transmitted by the additive manufacturing system. The remote computing system can transmit information to the I/O interface 2022 in response to particular in-process quality metrics. It should be noted that the sensors described in conjunction with FIG. 6 can be used in the described ways to characterize performance of any additive manufacturing process involving sequential material build up.

While the embodiments described herein have used data generated by optical sensors to determine the thermal energy density, the embodiments described herein may be implemented using data generated by sensors that measure other manifestations of in-process physical variables. Sensors that measure manifestations of in-process physical variables include, for example, force and vibration sensors, contact thermal sensors, non-contact thermal sensors, ultrasonic sensors, and eddy current sensors. It will be apparent to one of ordinary skill in the art that many modifications and variations are possible in view of the above teachings.

In some embodiments the system can be configured to monitor the cooling rates and alert a user if a cooling rate is faster or slower than a given threshold value and thus is used as a quality control metric. In further embodiments the system can be configured to change the cooling rate such that the material properties are tuned to the particular needs of the application. In yet further embodiments the cooling rate can be varied within a part such that one region of the part has a high hardness and/or high yield strength while another region of the part has a low hardness and/or reduced yield strength. For example, a pliers may need a high strength region at the jaws and a lower strength more ductile region at the handle. In another embodiment, for example a bearing, a high hardness may be formed at the bearing surface and a lower hardness may formed within the bulk of the structure. One of skill in the art having the benefit of this disclosure will appreciate the myriad ways in which changing the material properties within a particular part can be beneficial.

In some embodiments a calibration routine can be performed to vary the input power and the corresponding cooling rate and determine the effects on microstructure. In further embodiments a build coupon can be built alongside the part and the coupon can be used to verify the mechanical properties of the built part.

In some embodiments the temperature is recorded at a rate between 100 and 300 kHz, while in other embodiments it is recorded at a rate between 300 and 800 kHz and in some embodiments is recorded at a rate of 800 kHz to 2 MHz.

Some embodiments described herein use an instantaneous rate calculation which is calculated based on the previous data point collected, however other methods can be used including averaging over time, relative maximum identification, relative minima identification, etc. In some embodiments a radius of the field of view of the optical sensor is roughly 10 millimeters and the speed at which the laser moves along the track is 1 meter/second. In some embodiments the liquid to solid transition of the melt pool can be monitored using one or more sensors and the cooling rate can be determined from the phase transition data.

In some embodiments a new phase diagram based on the fusing/melting of additive manufacturing powder at different power levels can be produced. Thus at a certain composition and a particular cooling rate a characteristic microstructure can be expected.

In further embodiments the cooling rate can be recorded and analyzed on a layer by layer sequence. In some embodiments if a cooling rate for a portion of a layer is found to be outside of a specification the material can be reheated by the laser and/or the compensations in energy and/or scan speed can be made in the next layer to correct the defect.

In some embodiments, the on-axis optical sensors, off-axis sensors, contact sensors, and other sensors (e.g., see FIG. 6) can be configured to generate in-process raw sensor data. In other embodiments, the on-axis optical sensors, off-axis optical sensors, contact sensors, and other sensors can be configured to process the data and generate reduced order sensor data.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. An additive manufacturing system comprising:
   a power source configured to scan a beam of energy across first and second work regions of a build plane;
   a sensor configured to sense a temperature of each of the first and second work regions; and
   a processor coupled to the sensor and configured to control a first cooling rate of the first work region after the first work region is fused by the beam of energy and to control a second cooling rate of the second work region after the second work region is fused by the beam of energy by controlling a thermal energy density (TED) of each of the first and second work regions, wherein the TED is determined by dividing the sensed temperature of the respective work region by an area of the respective work region, and wherein the first cooling rate is greater than the second cooling rate.

2. The additive manufacturing system of claim 1 wherein the sensor comprises a first emissivity sensor configured to detect a first range of wavelengths and a second emissivity detector configured to detect a second range of wavelengths, wherein the first and the second range are different ranges.

3. The additive manufacturing system of claim 2 wherein the first range of wavelengths and the second range of wavelengths are selected to be offset from one or more characteristic spectral peaks related to material properties of a metallic powder distributed across at least a portion of the first or second work regions.

4. The additive manufacturing system of claim 3 wherein the beam of energy creates a transient melt pool of the metallic powder.

5. The additive manufacturing system of claim 4 wherein the processor is configured to generate a notification if the first cooling rate or the second cooling rate of the transient melt pool is outside of an allowable range of cooling rates.

6. The additive manufacturing system of claim 1 wherein the power source is configured to fuse metallic powder distributed across at least a portion of the build plane along a plurality of sequential build tracks.

7. The additive manufacturing system of claim 6 wherein the power source is turned on at a beginning of each build track of the plurality of sequential build tracks and turned off at an end of each build track of the plurality of sequential build tracks.

8. The additive manufacturing system of claim 7 wherein the first cooling rate or the second cooling rate is determined at the end of each build track of the plurality of sequential build tracks.

9. The additive manufacturing system of claim 1 wherein a power of the power source is determined from a thermal energy density (TED) of a portion of the first or second work region.

10. The additive manufacturing system of claim 9 wherein the processor is configured to change the power of the power source in a portion of the first or second work region.

* * * * *